United States Patent
Mollier et al.

(10) Patent No.: US 10,114,338 B2
(45) Date of Patent: Oct. 30, 2018

(54) EXTERIOR SUB-ASSEMBLY FOR A TIMEPIECE OR WATCH OR PIECE OF JEWELLERY

(71) Applicant: Omega SA, Biel/Bienne (CH)

(72) Inventors: Adrien Mollier, Merzligen (CH); Daniel Knuchel, Bienne (CH)

(73) Assignee: Omega SA, Biel/Bienne (CH)

( * ) Notice: Subject to any disclaimer, the term of this patent is extended or adjusted under 35 U.S.C. 154(b) by 0 days.

(21) Appl. No.: 15/660,286

(22) Filed: Jul. 26, 2017

(65) Prior Publication Data
US 2018/0032033 A1 Feb. 1, 2018

(30) Foreign Application Priority Data

Jul. 26, 2016 (EP) .................................. 16181146

(51) Int. Cl.
*G04B 19/28* (2006.01)
*G04B 37/04* (2006.01)
(Continued)

(52) U.S. Cl.
CPC ..... *G04B 37/0463* (2013.01); *G04B 37/0091* (2013.01); *G04B 37/0427* (2013.01); *G04B 37/087* (2013.01); *G04B 19/283* (2013.01)

(58) Field of Classification Search
CPC ...... G04B 45/00; G04B 19/283; G04B 47/04; G04B 19/00; G04B 47/00; G04B 37/0463;
(Continued)

(56) References Cited

U.S. PATENT DOCUMENTS

| 4,347,594 A * | 8/1982 | Tschanz | G04B 19/223 368/21 |
| 5,822,279 A * | 10/1998 | Cuche | G04B 19/283 368/295 |

(Continued)

FOREIGN PATENT DOCUMENTS

| CH | 456 468 | 7/1968 |
| DE | 1 024 889 | 2/1958 |

(Continued)

OTHER PUBLICATIONS

European Search Report dated Feb. 17, 2017 in European Application 16181146.8 filed on Jul. 26, 2016 (with English Translation of Categories of Cited Documents).

*Primary Examiner* — Sean Kayes
(74) *Attorney, Agent, or Firm* — Oblon, McClelland, Maier & Neustadt, L.L.P.

(57) ABSTRACT

Exterior sub-assembly for a timepiece or watch or piece of jewelry, comprising a first component and a second component, arranged for a bayonet fitting between two rims and two wings comprised in the first component and the second component, and able to occupy an assembled and indexed position of the first and second components, this sub-assembly including a third component in the form of a ring, inserted between the first and second components and comprising a ring-like element housed inside a groove of the first or second component, this third component including a rotational stop with respect to the first or second component, and a resilient area with radial relief, cooperating in an angular indexing arrangement with a lug of the first or second component which is free to rotate with respect to the third component.

19 Claims, 2 Drawing Sheets

(51) Int. Cl.
*G04B 37/00* (2006.01)
*G04B 37/08* (2006.01)

(58) Field of Classification Search
CPC .............. G04B 37/0091; G04B 37/087; G04B 37/0427; A44C 25/00
See application file for complete search history.

(56) References Cited

U.S. PATENT DOCUMENTS

| | | | |
|---|---|---|---|
| 6,599,009 B2* | 7/2003 | Terasawa | G04B 19/283 |
| | | | 368/294 |
| 9,395,694 B1* | 7/2016 | Wong | G04B 19/286 |
| 9,857,772 B2* | 1/2018 | Jufer | G04B 37/1486 |
| 2003/0099165 A1* | 5/2003 | Terasawa | G04B 19/283 |
| | | | 368/294 |
| 2008/0273427 A1* | 11/2008 | Zimmermann | G04B 43/00 |
| | | | 368/293 |
| 2016/0041453 A1* | 2/2016 | Pizzo | G03B 17/14 |
| | | | 396/530 |
| 2016/0098013 A1* | 4/2016 | Kadmiri | G04B 19/283 |
| | | | 368/273 |
| 2016/0109853 A1* | 4/2016 | Kobayashi | G04B 19/286 |
| | | | 368/295 |

FOREIGN PATENT DOCUMENTS

| | | |
|---|---|---|
| DE | 1 089 332 | 9/1960 |
| DE | 20 2006 012 410 U1 | 10/2006 |
| DE | 20 2008 013 898 U1 | 1/2009 |
| GB | 751 246 | 6/1956 |

* cited by examiner

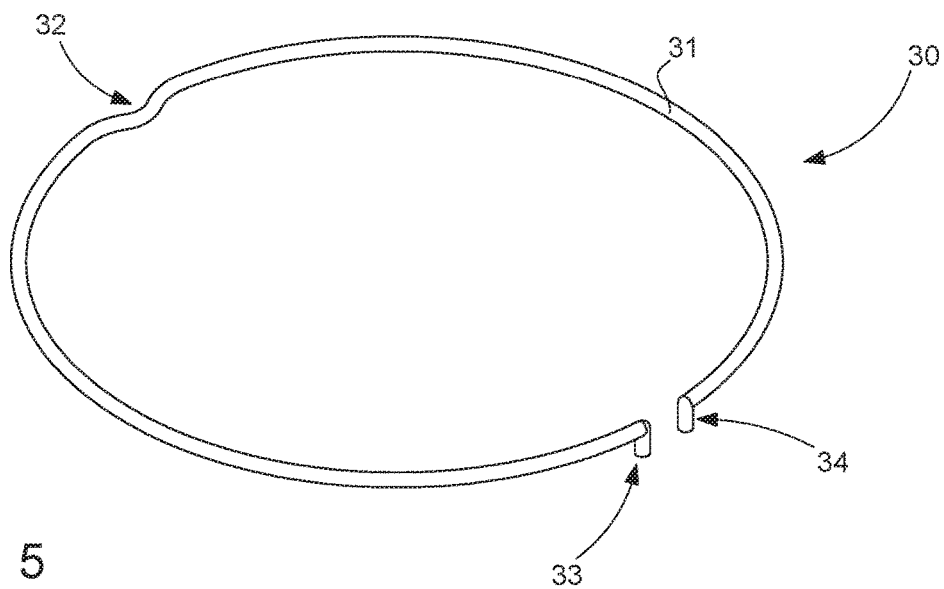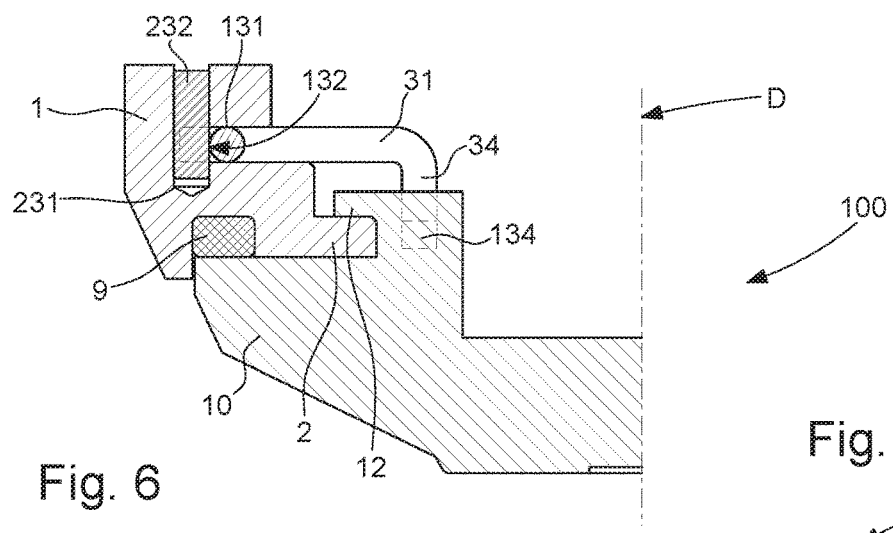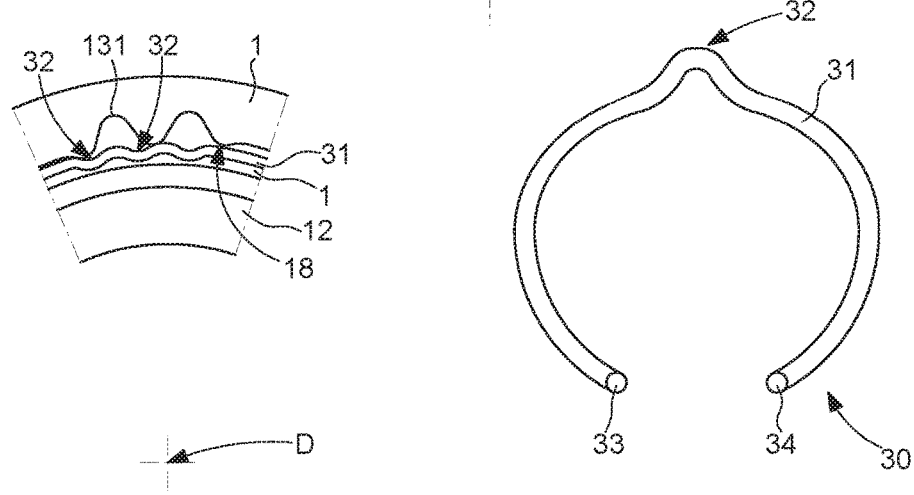

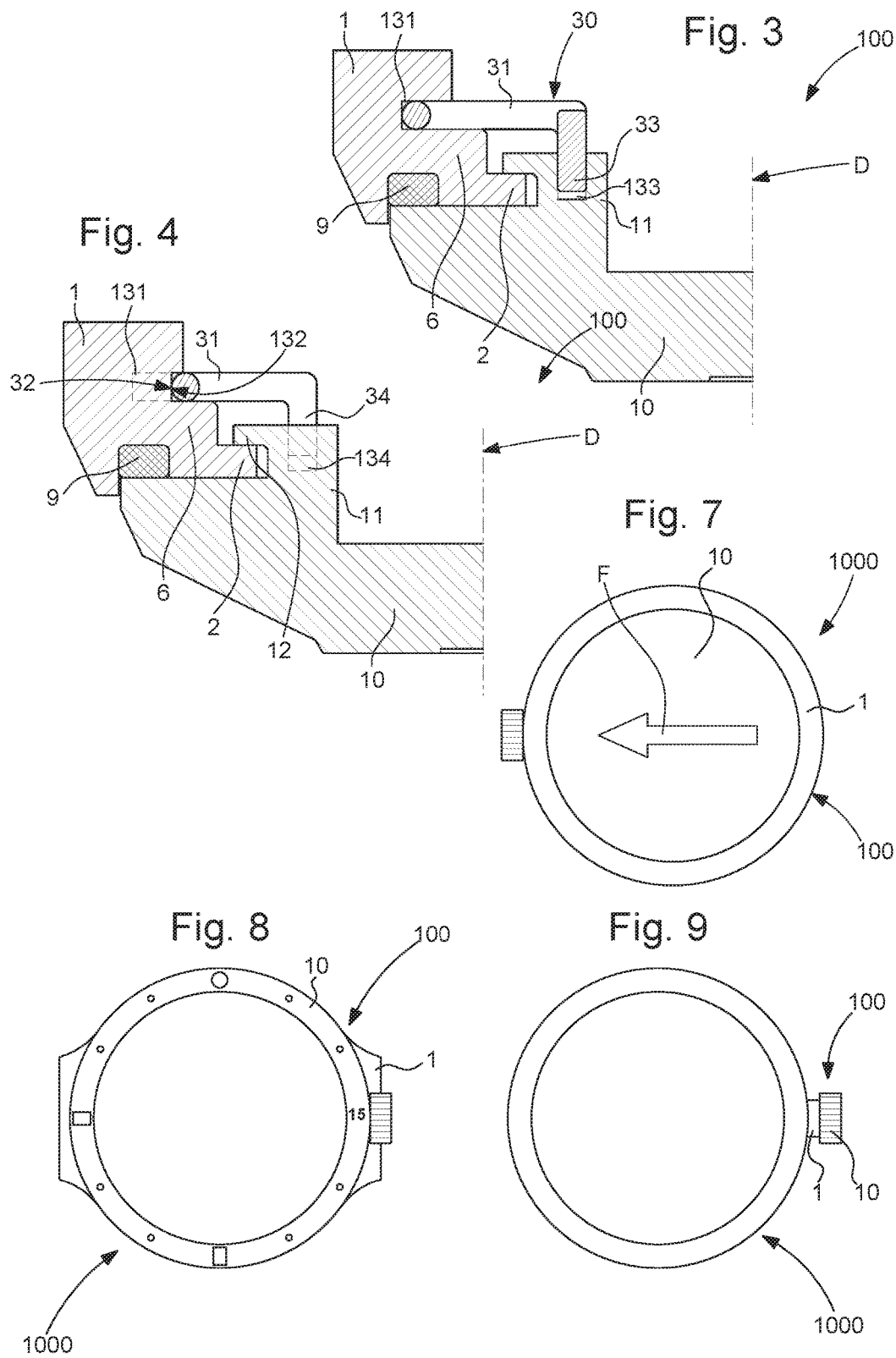

EXTERIOR SUB-ASSEMBLY FOR A TIMEPIECE OR WATCH OR PIECE OF JEWELLERY

This application claims priority from European Patent Application No. 16181146.8 filed on Jul. 26, 2016, the entire disclosure of which is hereby incorporated herein by reference.

FIELD OF THE INVENTION

The invention concerns a sub-assembly, known as an exterior sub-assembly, for a timepiece or for a watch or for a piece of jewellery, comprising a first component including rims projecting from a first skirt alternated with first recesses, and a second component comprising wings projecting from a second skirt alternated with second recesses, arranged to occupy a first disassembled position of insertion, in which said first component and said second component have a first angular orientation with respect to each other, or to occupy an assembled and locked position in which said first component and said second component have a second angular orientation with respect to each other, different from said first angular orientation, and are held axially by a bayonet fitting between at least two said rims and at least two said wings.

The invention also concerns a timepiece, particularly a watch, including such an exterior sub-assembly.

The invention also concerns a piece of jewellery including such a sub-assembly.

The invention concerns the field of exterior parts of watches, and the field of jewellery.

BACKGROUND OF THE INVENTION

The exterior parts of watches and similar devices observe numerous constraints, in particular as regards sealing, robustness and appearance, and must be designed to prevent any inadvertent disassembly, inevitably requiring after sales work to change gaskets, perform cleaning, lubrication, or even repair.

Some exterior or control components must also be angularly indexed with respect to each other, to locate original reference, rest or actuation positions, or to facilitate the reading of indications or graduations, or to ensure the continuity of warped surfaces and/or of decorations. This angular indexing is often difficult to achieve successfully in conjunction with properly clamped components and perfectly sealed gaskets.

SUMMARY OF THE INVENTION

The invention proposes to achieve a sealed and secure assembly of exterior components with easily adjustable angular indexing for precise position adjustment.

To this end, the invention concerns an exterior sub-assembly for a timepiece according to claim 1.

The invention also concerns a timepiece including such an exterior sub-assembly.

The invention also concerns a piece of jewellery including such a sub-assembly.

BRIEF DESCRIPTION OF THE DRAWINGS

Other features and advantages of the invention will appear upon reading the following detailed description, with reference to the annexed drawings, in which:

FIG. 1 represents a schematic, perspective, top view of a particular variant of a component according to the invention, in the form of a ring-like element comprising at least one elastic deformable area, in recessed relief here, this ring forming a third component arranged for insertion between a first component and a second component arranged to be fixed to each other in a bayonet arrangement.

FIG. 2 is a bottom plan view of a similar ring, comprising a protruding elastic deformable area.

FIG. 3 represents a schematic cross-section, passing through a main axis, of an exterior sub-assembly according to the invention, comprising a first component which is a case middle, underneath which is represented a second component, which is a case back, fixed to each other in a bayonet arrangement and gripping, on the one hand a sealing gasket, and on the other hand the ring of FIG. 1, housed here inside a groove of the first component and angularly stopped inside a stop housing of the second component, through which the cross-sectional plane passes.

FIG. 4 represents, in a similar manner to FIG. 3 the same sub-assembly, in another cross-sectional plane passing through the elastic deformable area of the ring and a bulge in the groove of the first component, and between the two stop housings comprised here in the second component.

FIG. 5 represents, in a similar manner to FIG. 4 and in the same cross-sectional plane, a particular variant wherein the groove of the first component is of revolution and wherein this first component includes a pressed-in pin, forming a stop in the indexing position of the elastic deformable area of the ring.

FIG. 6 is a partial cross-section, in a plane perpendicular to the main axis, and in the middle of the groove of the first component, in another variant wherein this groove includes an arrangement of notches, and wherein the ring includes a series of several elastically deformable areas.

FIG. 7 represents, in a schematic bottom view, a watch comprising such a sub-assembly wherein the case middle forms the first component, and a case back forms the second component.

FIG. 8 represents, in a schematic top view, a watch comprising such a sub-assembly wherein a case middle forms the first component, and a bezel forms the second component.

FIG. 9 represents, in a schematic top view, a watch comprising such a sub-assembly wherein a tube secured to a case middle forms the first component, and a crown forms the second component.

DETAILED DESCRIPTION OF PREFERRED EMBODIMENTS

The invention proposes to achieve a sealed and secure assembly of exterior components with easily adjustable angular indexing and with a reduced number of components.

The invention concerns an exterior sub-assembly 100 for a timepiece, and more particularly for a watch, or for a piece of jewellery, comprising a first component 1 having rims 2 protruding from a first skirt 6 alternated with first recesses, and a second component 10 including wings 12 protruding from a second skirt 11 alternated with second recesses.

The general term "exterior" sub-assembly is used here both for a timepiece and for a piece of jewellery, although this term is commonly used only in horology. It is understood, that, in the case of jewellery, this sub-assembly may concern the structure of the piece of jewellery, or elements added to a basic structure, or any assembly of several basic or pre-assembled components, or even the entire piece of jewellery.

This exterior sub-assembly 100 is arranged to change from a first disassembled position of insertion, to a second, assembled and locked position.

In the first disassembled position of insertion, first component 1 and second component 10 have a first angular orientation with respect to each other.

In a particular, non-limiting variant, comprising repulsion means arranged on the interface between first component 1 and second component 10, these latter tend to be kept at a distance from each other by repulsion means, which include magnetic repulsion means and/or at least one resilient element and/or at least one sealing gasket 9. The change from the first, disassembled position of insertion to the second, assembled and locked position is achieved under the action of forces exerted by an operator: an axial force to overcome the resistance force of the repulsion means and place first component 1 and second component 10 in contact, and a torque to bring them into an angular indexing position.

In the second, assembled and locked position, first component 1 and second component 10 have a second angular orientation with respect to each other, different from the first angular orientation. In the particular variant including repulsion means, first component 1 and second component 10 are held axially against the resistance force exerted by the repulsion means, by means of a bayonet fitting, realized by the application of axial and torque forces imparted by the operator, between at least two rims 2 and at least two wings 12.

The joining of first component 1 and second component 10, by a bayonet fitting, particularly around an axial direction D, is reversible and allows for disassembly of said components. According to the invention and in a complete departure from the prior art, this disassembly requires, on the part of the operator, similar forces to those exerted during assembly, this disassembly preferably requires the use of a special tool cooperating, for example, with peripheral notches or holes, or similar, and cannot result from mishandling or from exposure to particular external physical factors.

In a particular variant including repulsion means and, more particularly, in the non-limiting variants illustrated by FIGS. 3 to 5, exterior sub-assembly 100 includes at least one sealing gasket 9 between a first component 1 and a second component 10. In these same variants, first component 1 includes rims 2 protruding radially inwardly from a first skirt 6, which are alternated with first recesses. Second component 10 includes wings 12 protruding radially outwardly from a second skirt 11, which are alternated with second recesses. Exterior sub-assembly 100 is arranged to change from a disassembled position to an assembled position compressing a sealing gasket 9, by the reversible joining of first component 1 and second component 10, in a bayonet fitting between at least two rims 2 and at least two wings 12, in a relative rotational motion about an axial direction D. Although axial compression of sealing gasket 9 is most conventional, the invention also allows for easy assembly with radial compression of such a gasket. It is understood that the invention is illustrated here in a particular variant, with radially protruding rims and wings. The invention is also applicable to other variants wherein the axial and radial configurations are reversed.

According to the invention, this sub-assembly 100 includes at least a third component 30 in the form of a ring, which is inserted, particularly radially in the illustrated variants, between first component 1 and second component 10. This third component 30 more particularly includes a ring 31, i.e. a thin ring, not necessarily closed, which is arranged to be housed inside a groove 131 comprised at least in first component 1 or second component 10. More particularly, this ring 31 includes segments similar to a ratchet in order to easily allow only a unidirectional manoeuvre, as in the particular case where the invention is used for a unidirectional bezel. Such a ring may be long and thin, of substantially round cross-section, or of rectangular cross-section, or otherwise.

More particularly, this ring 31 is resilient, it may, in particular, be made of spring wire, steel wire, or stamped, or moulded, in a resilient or similar material.

This third component 30 includes at least one rotational stop 33, 34, with respect to first component 1 or to second component 10.

Third component 30 also includes at least one resilient area 32, which is radially recessed in the FIG. 1 variant, respectively radially protruding in the FIG. 2 variant, and which is arranged to cooperate, in a plane passing into the groove, in an angular indexing and locking arrangement with a lug 132, respectively a housing, comprised in whichever of first component 1 and second component 10 is free to rotate with respect to third component 30. This resilient area 32 is a radial relief area in the illustrated variants wherein the bayonet mechanism is based on radial extensions, it may be an axial relief area in another application with cooperation via axial relief in the assembly mechanism.

In a variant illustrated by FIG. 5, this lug 132 is added inside groove 131, which is then machined in revolution about axis D. More particularly, this lug 132 is formed by a pin 232, or suchlike, which simply needs to be driven into a simple drilled hole 231 made in first component 1.

In the case where lug 32 is an added component, although this pin is the simplest embodiment, it does not exclude other variants, for example in a dovetail fitting or suchlike. In a variant, lug 132 may itself be resilient, and for example made of amorphous metal or suchlike.

In another variant, illustrated by FIGS. 3 and 4, groove 131 is made by contouring, or by injection, or similar, and directly includes lug 132, or the housing in a reverse variant.

More particularly, this third component 30 is fixed in rotation with respect to first component 1 or to second component 10, and resilient area 32 provides a resistance torque of variable moment against any relative tangential torque between first component 1 and second component 10.

And any passage of a lug 132, or respectively of a housing, over a resilient area 32, generates a resistance torque which tends to resist the relative rotational motion between first component 1 and second component 10.

At least one resilient area 32 is arranged for the relative angular indexing between first component 1 and second component 10.

More particularly, second component 10, in the variant illustrated by FIGS. 3 to 5, includes at least one stop housing 133 or 134 for a foot, forming a rotational stop 33, 34, comprised in third component 30. More particularly, as illustrated by the Figures, third component 30 comprises two rotational stops 33 and 34, arranged to cooperate with two corresponding stop housings 133, 134.

These feet give the assembly rigidity.

FIG. 1 illustrates a variant wherein the two rotational stops 33 and 34 are perpendicular to the plane of ring 31. It is naturally possible to adopt other shapes, in particular with radial stops in the plane of ring 31, or otherwise.

More particularly, in this latter variant, the space between the two stop housings 133 and 134 may be different from the space between rotational stops 33 and 34 in the non-tensioned state, so as to impart a stress on ring 31: if the profile of ring 31 in the non-tensioned state is circular, with the exception of resilient area 32, this stress can give it an elliptical shape in the tensioned state, with friction in one portion of groove 131, so as to brake first component 1 with respect to second component 10, which may be useful, particularly upon disassembly for maintenance.

A similar result can be achieved with a particular shape of ring 31 in the non-tensioned state: ellipsis, a wavy or multilobal circle, or other.

A surface treatment applied to the component carrying groove 131 and/or to ring 31 also makes it possible to achieve a friction surface which can prove useful for resisting any untimely disassembly: the user must in that case take a tool, preferably a special tool, to impart a relative rotation between the first and second component, and overcome the main resistance threshold of area 32 which is added to a resistant friction force.

More particularly, as seen in FIG. 6, third component 30 comprises, on at least one elastically deformable area, a plurality of resilient areas 32 arranged to provide successive resistance against a complementary relief 18 comprised in the opposing component, for example an arrangement of notches or suchlike, which may be composed of a series of housings.

More particularly still, as also seen in FIG. 6, in the same elastically deformable area, the successive resilient areas 32 are arranged to provide increasing resistance against such a complementary relief 18. In a particular and advantageous manner, such a series of resilient areas 32 and/or complementary reliefs 18 may be arranged to provide an increasing resistance torque during the rotational motion to the indexing position imparted by the operator, for example with an increase in projecting portions or suchlike.

It is thus possible to achieve strong gradual braking during the relative rotation between the first component and the second component, before reaching a position in which the extent of relative relief between ring 31 and lug 132, or the profile of groove 131, depending on the case, is such that the resistance torque is at maximum value, which corresponds to a specific indexing position. Such notch arrangements can also protect against an untimely disassembly of the sub-assembly.

Naturally, a reverse assembly, wherein the first component 1 carries a stop housing 133 or 134, and wherein the second component 10 includes lug 132 or suchlike, is also achievable, but is not described in detail since it is easy to transpose for those skilled in the art.

More particularly, and as seen in FIGS. 1 and 2, ring 31 is open and thus includes two free ends in the free, non-tensioned state of the ring. This peculiarity facilitates, in particular, the tensioning of the ring, as explained above.

It will be noted that, when a sealing gasket is unnecessary, the third component 30 may form the repulsion means, especially in the form of a ring 31 that is non-planar, but wavy or similar.

In an advantageous, non-limiting application, seen in FIG. 7, first component 1 is a case middle and second component 10 is a case back. In a particular variant, the presence of at least one sealing gasket is required. In a non-illustrated variant, first component 1 is a case back and second component 10 is a decorative element, such as a medallion, or similar, added to the case back, in which case there is no need for a gasket between them, and the presence of a spring, or of ring 31 itself, may be perfectly sufficient in a variant comprising repulsion means.

It is noted, in this regard, that the invention may be implemented without such means of repulsion, particularly for applications for exterior parts or similar.

In another application, first component 1 is a case middle and second component 10 is a flange or a bezel, as seen in FIG. 8. This case is well suited to a variant in which a first component and a second component tend to be moved away from each other, by magnetic repulsion, or even by a resilient element such as a ring, i.e. a thin ring, not necessarily closed, or more particularly a ring including segments similar to a ratchet to easily allow only a unidirectional manoeuvre, as in the particular case where the invention is used for a unidirectional bezel. Such a ring may be long and thin, of substantially round cross-section, or of rectangular cross-section, or otherwise. Or, in a particular variant, it is simply the actual third component 30 that forms the repulsion means, which substantially reduces the number of components while very satisfactorily ensuring the required hold. In such case, ring 31 may comprise both a relief in its main plane for the indexing between first component 1 and second component 10, and another relief in the axial direction of sub-assembly 100, to form such repulsion means.

In yet another application, first component 1 is a case middle or a tube added to a case middle, and second component 10 is a crown, as seen in FIG. 9. In a variant, second component 10 is a winding stem or a push-piece. In these cases too, the presence of at least one sealing gasket is obligatory.

The choice of pairs of materials formed, two-by-two, by the first and third components and the second and third components, allow different friction characteristics to be obtained with the identical geometry, especially if some of these components have a friction surface resulting from application of a surface treatment. This makes it possible to modulate the resistance force, which is particularly useful for protecting against inadvertent disassembly. Ring 31, which ensures that forces are absorbed particularly in the event of shocks, also protects the surfaces of the components, which is advantageous, for example, if at least one of the components is made of ceramic, the ring is then advantageously made of at least partially amorphous metal, "Liquidmetal©" or suchlike.

The invention is suitable for numerous applications in horology, for example for a helium valve in a divers' watch, or for exterior components such as a bracelet or strap, a buckle, a clasp or suchlike. The same applies to jewellery, for effecting closure of cuff links, or of earrings, or for fixing gemstones or decorative elements devised to be removable.

The invention also concerns a timepiece, particularly a watch 1000, including such an exterior sub-assembly 100.

The invention also concerns a piece of jewellery including such a timepiece sub-assembly 100.

The invention therefore makes it possible to prevent any untimely and inadvertent disassembly of sub-assembly 100, for example under the effect of vibrations, successive expansion cycles, through misuse by the user, or otherwise.

An important advantage of the invention is that it only requires simple, easily achievable machining operations, thereby avoiding dirtying or tainting the watch and for a moderate cost.

The invention also ensures the perfect orientation of a component held locked in its service position.

The invention also makes it possible for opposing components made of different types of materials to cooperate with each other, without expansion, friction, elasticity or other stresses, without requiring external securing elements such as screws or suchlike, without screw threads or machining likely to weaken particular materials, such as ceramics, sapphire and suchlike. It exhibits very good resistance to accidental or even deliberate loosening by vibration or of the Chapuis shock type. The invention also ensures the interchangeability of components and consequently, improved customisation of watches or jewellery for users.

This invention can be applied equally to watches or jewellery made of precious materials and to mass produced products including components with a low unit cost, particularly made of plastic or similar material.

The invention is well suited to cases where sub-assembly 100 includes components 1 and 10 made of different materials, with different expansion coefficients, or brittle or hard materials (ceramics, sapphire, precious stones, gems, cameos), which do not allow for standard fastening methods. Conventional configurations that can be cited include the assembly of a gold case middle to a sapphire case back, or a case made entirely of ceramic, a metal-ceramic combination, or suchlike. Components 1 and 10 may thus be made in all sorts of materials: metal alloys, especially precious or graded alloys, stainless steels, at least partially amorphous metal alloys, or Liquidmetal© or similar, ceramics, sapphire, minerals, hard stones, rubber, plastic materials and particularly thermoplastic elastomer known as TPE, especially thermoplastic polyurethane known as TPU, polycarbonates known as PC, polyvinyl chloride known as PVC, polyacetals, polyoxymethylene known as POM, silicone, Nylon®, to mention, in a non-limiting manner, only materials used in horology and jewellery.

What is claimed is:

1. An exterior sub-assembly for a timepiece, or for a watch, or for a piece of jewellery, comprising a first component having rims protruding from a first skirt alternated with first recesses, and a second component including wings protruding from a second skirt alternated with second recesses, arranged to occupy a first disassembled position of insertion in which said first component (1) and said second component have a first angular orientation with respect to each other, or to occupy a second, assembled and locked position in which said first component and said second component have a second angular orientation with respect to each other, different from said first angular orientation, and are held axially in a bayonet fitting between at least two said rims and at least two said wings, characterized in that said sub-assembly comprises at least one third component in the form of a ring, which is inserted between said first component and said second component and comprising a ring-like element housed inside a groove comprised in at least said first component or said second component, and said third component includes at least one rotational stop, with respect to said first component or second component, and at least one radially recessed or respectively radially protruding resilient area, arranged to cooperate, in a plane passing into said groove, in an angular indexing and locking arrangement with a lug or respectively a housing, comprised in whichever of said first component and second component is free to rotate with respect to said third component.

2. The exterior sub-assembly according to claim 1, characterized in that, in said first disassembled position of insertion, said first component and said second component have a first angular orientation with respect to each other, and are kept at a distance from each other by repulsion means, which include magnetic repulsion means and/or at least one resilient element and/or at least one sealing gasket, and in that, in said second, assembled and locked position, said first component and said second component are held axially against a resistance force exerted by said repulsion means.

3. The exterior sub-assembly according to claim 2, characterized in that said third component forms said repulsion means.

4. The exterior sub-assembly according to claim 2, characterized in that said repulsion means comprise at least one said sealing gasket.

5. The exterior sub-assembly according to claim 4, characterized in that said repulsion means comprise at least one said sealing gasket, in that said rims protrude radially inwardly from said first skirt, said wings protruding radially outwardly from said second skirt, and in that said third ring-shaped component is arranged to be radially inserted between said first component and said second component.

6. The exterior sub-assembly according to claim 1, characterized in that said third component is fixed in rotation with respect to said first component or to said second component, and in that said resilient area provides a resistance torque of variable moment against any relative tangential torque between said first component and said second component, and any passage of a said lug or housing over a said resilient area generating a resistance torque tending to resist the relative rotational movement between said first component and said second component, at least one said resilient area being arranged for the relative angular indexing between said first component and said second component.

7. The exterior sub-assembly according to claim 1, characterized in that said lug is added inside said groove which is a groove of revolution with respect to said axis.

8. The exterior sub-assembly according to claim 1, characterized in that said groove directly contains said lug, or said housing in the reverse configuration.

9. The exterior sub-assembly according to claim 1, characterized in that said ring-like element is resilient.

10. The exterior sub-assembly according to claim 1, characterized in that said second component includes at least one stop housing for a foot forming a said rotational stop comprised in said third component.

11. The exterior sub-assembly according to claim 10, characterized in that said third component comprises two said rotational stops, arranged to cooperate with two corresponding said stop housings, wherein the space therebetween is different from the space in the non-tensioned state between said rotational stops, so as to impart a stress on said ring-like element when it is in position.

12. The exterior sub-assembly according to claim 1, characterized in that the component carrying said groove, and/or said ring-like element comprises a friction surface arranged to resist a frictional resistance force upon disassembly of said sub-assembly.

13. The exterior sub-assembly according to claim 1, characterized in that said third component comprises, on at least one deformable area, a plurality of resilient areas arranged to provide successive resistance against a said complementary relief.

14. The exterior sub-assembly according to claim 13, characterized in that, in the same said deformable area, said successive resilient areas are arranged to provide increasing resistance against a said complementary relief.

15. The exterior sub-assembly according to claim 1, characterized in that said first component is a case middle and said second component is a case back.

16. The exterior sub-assembly according to claim 1, characterized in that said first component is a case middle and said second component is a flange or a bezel.

17. The exterior sub-assembly according to claim 1, characterized in that said first component is a case middle or a tube added to a case middle, and said second component is a crown.

18. A watch including an exterior sub-assembly according to claim 1.

19. A piece of jewellery comprising an exterior sub-assembly according to claim 1.

* * * * *